United States Patent
Tsai

(10) Patent No.: US 7,847,204 B2
(45) Date of Patent: Dec. 7, 2010

(54) MULTICOLOR TRANSPARENT COMPUTER KEYBOARD

(75) Inventor: Huo-Lu Tsai, Ta Ya Shiang (TW)

(73) Assignee: Sunrex Technology Corp., Ta Ya Shiang, Taichung Hsien (TW)

( * ) Notice: Subject to any disclaimer, the term of this patent is extended or adjusted under 35 U.S.C. 154(b) by 810 days.

(21) Appl. No.: 11/779,296

(22) Filed: Jul. 18, 2007

(65) Prior Publication Data

US 2009/0021400 A1    Jan. 22, 2009

(51) Int. Cl.
*H01H 9/18* (2006.01)

(52) U.S. Cl. .................. 200/314; 200/310; 200/313

(58) Field of Classification Search ......... 200/310–314, 200/344; 341/22, 23, 28; 345/168–171; 379/433.07; 400/484, 485; 235/454, 145 R; 362/23, 24, 26, 30, 85, 27, 231, 248, 293, 362/616, 600
See application file for complete search history.

(56) References Cited

U.S. PATENT DOCUMENTS

| | | | | |
|---|---|---|---|---|
| 5,950,809 A * | 9/1999 | Andre | | 200/314 |
| 6,608,271 B2 * | 8/2003 | Duarte | | 200/311 |
| 6,761,462 B2 * | 7/2004 | Yoshida | | 362/109 |
| 7,070,290 B2 * | 7/2006 | Lee | | 362/27 |
| 7,271,360 B2 * | 9/2007 | Kobayashi | | 200/314 |
| 7,331,727 B2 * | 2/2008 | Salman et al. | | 400/472 |
| 7,333,031 B1 * | 2/2008 | Bantner | | 341/22 |
| 7,335,844 B2 * | 2/2008 | Lee et al. | | 200/310 |
| 7,369,064 B2 * | 5/2008 | Yeh | | 341/22 |
| 7,503,683 B2 * | 3/2009 | Liu | | 362/616 |
| 7,523,862 B2 * | 4/2009 | Tracy et al. | | 235/454 |
| 7,525,056 B2 * | 4/2009 | Chiba et al. | | 200/314 |
| 7,686,465 B2 * | 3/2010 | Okayasu | | 362/23 |

* cited by examiner

*Primary Examiner*—Michael A Friedhofer

(57) ABSTRACT

A multicolor transparent computer keyboard for operating a computer in a dark environment includes transparent keypads each on a top including spaced transparent color layers occupying four corners and being different in color from each other, an opaque layer on the color layers and having portions overlapped with the color layers being removed, and characters printed on the opaque layer; bridges pivotably interconnecting the key caps and an underlying transparent frame plate; a PCB under the frame plate; and a luminescence panel under the PCB and including cells each below the key cap, each cell including regions of different colors and adapted to electrically activate to upward emit light which is adapted to show multi-color when passing a gap between the color layers and show a backlit color when passing one of the color layers. The backlit color of each color layer is different from that of another color layer.

5 Claims, 5 Drawing Sheets

A

B

MULTICOLOR TRANSPARENT COMPUTER KEYBOARD

BACKGROUND OF THE INVENTION

1. Field of Invention

The invention relates to computer keyboard lighting and more particularly to a transparent keyboard of a computer (e.g., notebook computer), the keyboard having a lighting means adapted to, for example emit light from below the keys within the keyboard four different colors to illuminate four different portions of a key cap of any letter keys respectively.

2. Description of Related Art

Keyboard of a notebook computer may incorporate a thin keyboard comprising a plurality of keys and a plurality of scissors-type or bridge-type supports each mounted between the key and an underlying base board. A linking mechanism of the scissors-type or bridge-type support is disclosed in U.S. Pat. No. 5,278,372 and U.S. Pat. No. 5,767,468. While the keyboard is thin, lightweight, and easy to operated, it is not provided with backlighting. Hence, the keyboard is not adapted to operate in a low light or dark environment, thereby limiting its applications.

U.S. Pat. No. 6,545,232 as invented by the present inventor is incorporated herein by reference. The patent discloses a thin light permeable keyboard multiple switch assembly including scissors type actuator mechanisms. The luminescence board under the keys is adapted to emit monochromatic light to illuminate the keys. It is known that a plurality of characters (e.g., an English letter, a Mandarin phonetic symbol, a Dayi input symbol, and a Changjei input symbol) are printed on a top surface of a key cap. Thus, a user may have difficulties of quickly finding a portion of the key cap which corresponds to the desired symbol on the key cap that the user is looking for. Hence, a need has arisen for an improved transparent computer keyboard having a lighting means adapted to, for example emit light from below the keys within the keyboard four different colors to illuminate four different portions of a key cap of any letter keys respectively in order to overcome the inadequacy of the prior art.

SUMMARY OF THE INVENTION

It is therefore one object of the invention to provide a keyboard for use with a computer, the keyboard comprising a plurality of substantially square key caps formed of a transparent material and each including on a top surface a plurality of spaced transparent color layers occupying a predetermined area proximate four corners and being different in color from each other, an opaque layer on the color layers and having portions overlapped with the color layers being removed, and a plurality of characters printed on the opaque layer; a plurality of bridges each including a first member and a second member pivotably connected together at a center line wherein each of the first and the second members has a top edge pivotably secured to an underside of the key cap; a transparent substantially rectangular frame plate pivotably secured to a bottom edge of each of the first and the second members and including a plurality of holes and a plurality of elastic, hollow contact inserts anchored in the holes; a PCB under the frame plate and being adapted to electrically connect to the contact inserts when the contact inserts contact it; a luminescence panel under the PCB and including a plurality of cells each disposed below the key cap by a predetermined distance, each cell including a plurality of regions being different in color from each other; and a base plate for supporting the frame plate, the PCB, and the luminescence panel, wherein each cell of the luminescence panel is adapted to electrically activate to upward emit light for showing multi-color when passing a gap between the color layers and showing a backlit color when passing one of the color layers, and wherein the backlit color of each one of the color layers is different from that of another one of the color layers. By utilizing this, a multicolor transparent computer keyboard is effected and a user is enabled to easily operate a computer in a low light or dark environment.

The above and other objects, features and advantages of the invention will become apparent from the following detailed description taken with the accompanying drawings.

DETAILED DESCRIPTION OF THE INVENTION

Figure 1:
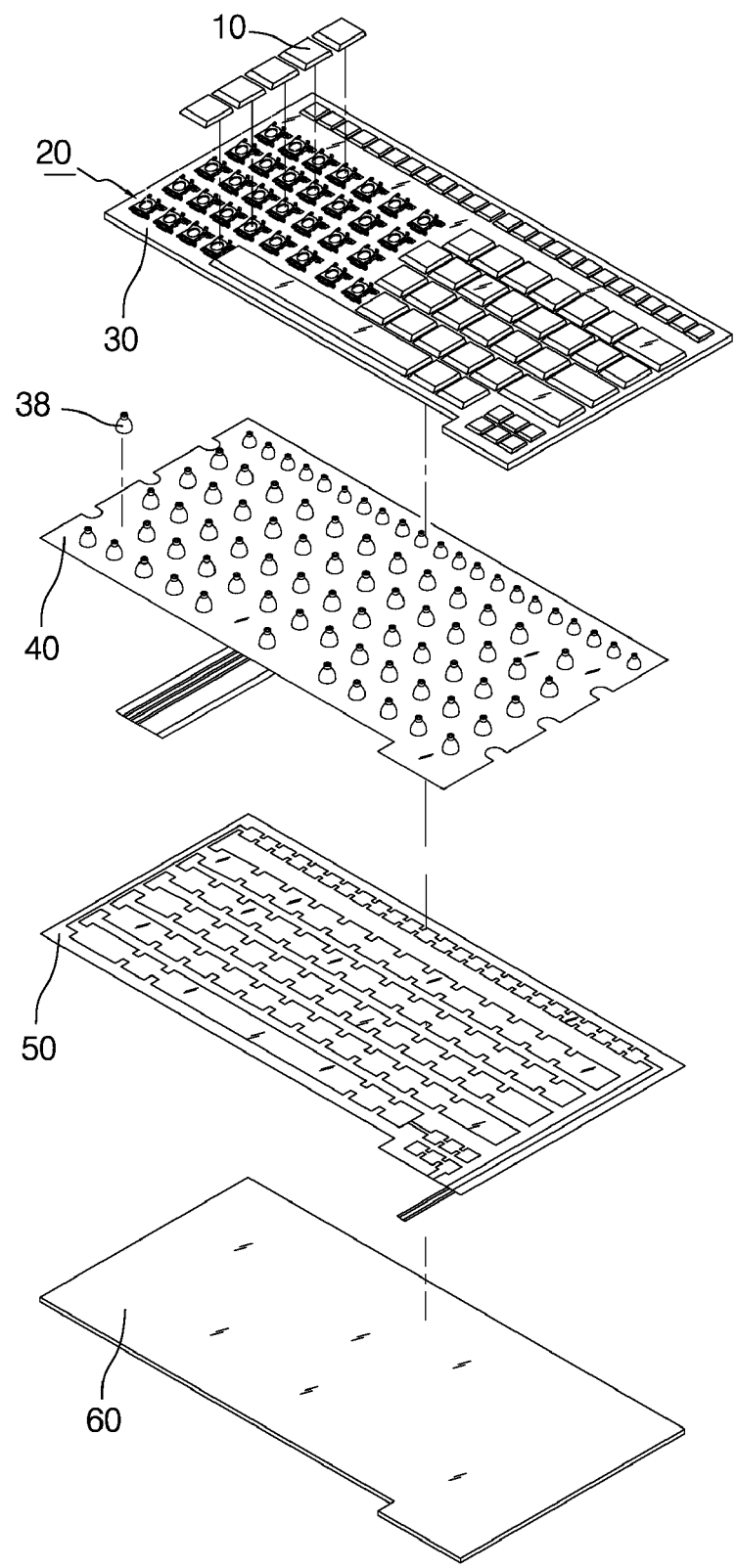
FIG. 1 is an exploded perspective view of a computer keyboard in accordance with the present invention.
Figure 2:
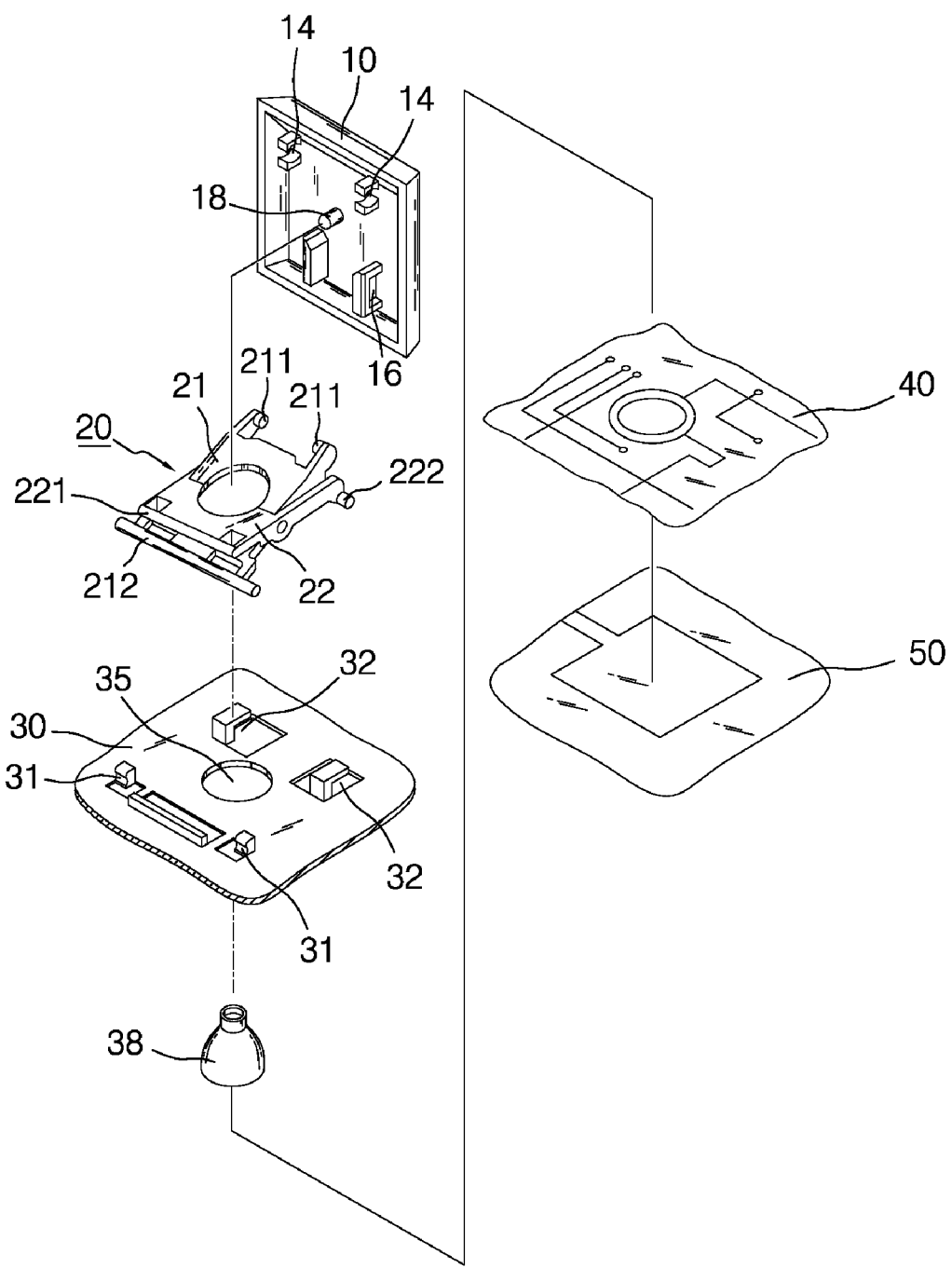
FIG. 2 is an enlarged exploded view of one of the key switches.
Figure 3:
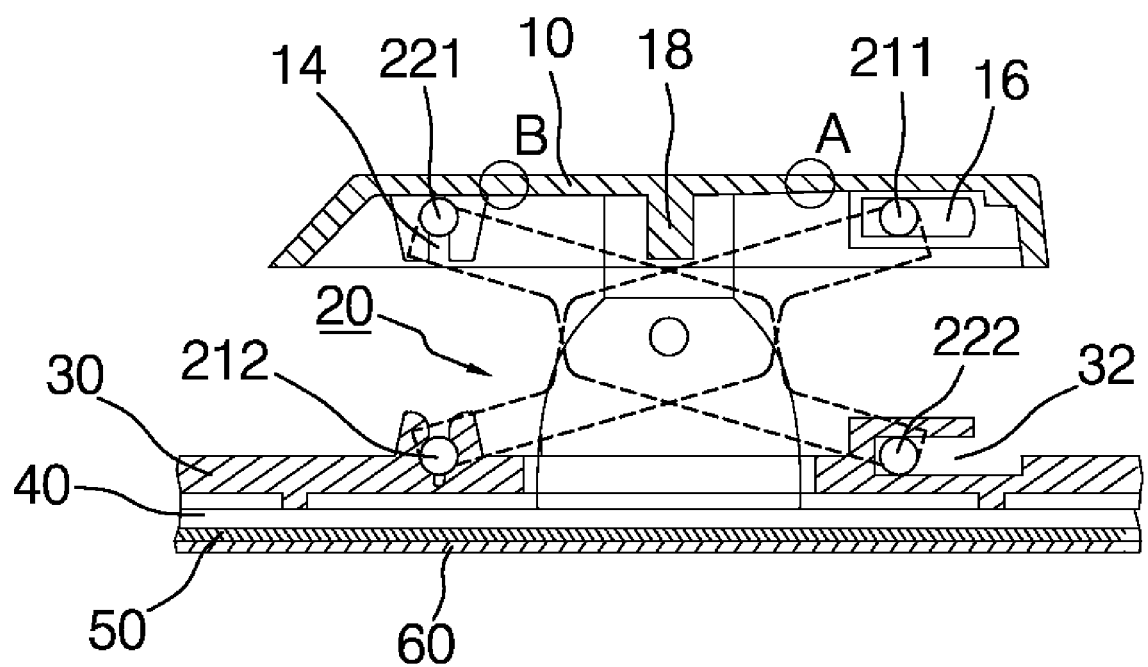
FIG. 3 is a longitudinal sectional view of the assembled key switch.
Figure 4:
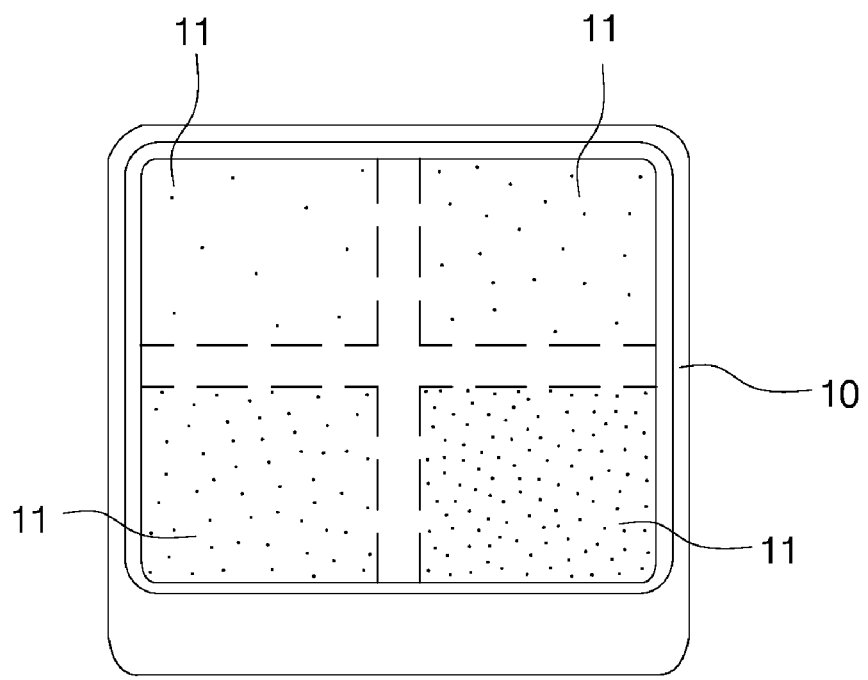
FIG. 4 is a top plan view of a key cap with transparent color layers of four different colors at four corner portions of the key cap mounted in the key cap.

Referring to FIGS. 1 to 7, a computer keyboard in accordance with a preferred embodiment of the invention comprises a plurality of transparent key caps 10, a plurality of bridge structures 20, a frame plate 30, a PCB (printed circuit board) 40, a luminescence panel 50, and a base plate 60. Each component is discussed in detail below.

Each key cap 10 is formed of a transparent material, is substantially a square or rectangle, and is adapted to be depressed. Each key cap 10 on its underside has two spaced troughs 14 proximate one edge, two spaced guide grooves 16 proximate the other edge, and a central post 18. A top surface of the key cap 10 is coated with a plurality of (e.g., four) spaced transparent color layers 11 of rectangular shape (see FIG. 4). The colors of the transparent color layers 11 are different from each other. The transparent color layers 11 occupy four corner portions of the top surface of the key cap 10. Moreover, an opaque layer 12 is coated on the transparent color layers 11. Portions of the opaque layer 12 being overlapped with the transparent color layers 11 are removed by laser scribing so as to expose a plurality of characters (e.g., an English letter, a Mandarin phonetic symbol, a Dayi input symbol, and a Changjei input symbol) printed on the top surface of the key cap 10 (see FIG. 5). A transparent protective layer 13 is again coated on the characters for protecting same. In configuring as above, a user may quickly find a portion of the key cap 10 which corresponds to the desired character on the key cap 10 that the user is looking for.

The bridge structure 20 includes a first member 21 and a second member 22 pivotably connected together at a center line. The first member 21 has a bifurcation on a top edge, a pivot 211 being formed at an end of the bifurcation and facing the other pivot 211. The pivots 211 are adapted to pivotably fasten in the guide grooves 16. The first member 21 further has a pivot shaft 212 formed along a bottom edge. The second member 22 has a pivot shaft 221 formed along a top edge and pivotably mounted in the troughs 14. The second member 22 further has two laterally extending pins 222 at both ends of a bottom edge.

The frame plate 30 is a substantially rectangular transparent board. The frame plate 30 is provided with two spaced snapping grooves 31 proximate one edge and two spaced inverted L-shaped guide grooves 32 proximate the other edge. The pivot shaft 212 of the first member 21 is pivotably secured in the snapping grooves 31. The pins 222 of the second member 22 are slidably mounted in the guide grooves 32. Thus, the bridge structure 20 is adapted to pivot between the key cap 10 and the frame plate 30, thereby forming a bridge type press button structure.

The frame plate 30 is further provided with a plurality of circular holes 35 each for allowing one of a plurality of elastic, hollow contact inserts 38 to anchor therein. The contact insert 38 has a top sleeve (not numbered) put on the post 18 and an enlarged lower portion secured to the PCB 40 by gluing. The contact insert 38 further has an internal stem (not shown) adapted to push downward to contact the PCB 40 for conduction.

The PCB 40 is a rectangular member and is disposed between the luminescence panel 50 and the frame plate 30. The luminescence panel 50 is divided into a plurality of cells (not shown) in which the number of the cells is equal to that of the key caps 10 and the cells are aligned with the key caps 10 from below. Further, each cell is divided into a plurality of regions of different colors (e.g., four regions each having a color different from another). The luminescence panel 50 is mounted between the PCB 40 and the base plate 60. The base plate 60 is adapted to support the frame plate 30, the PCB 40 and the luminescence panel 50.

Figure 5:
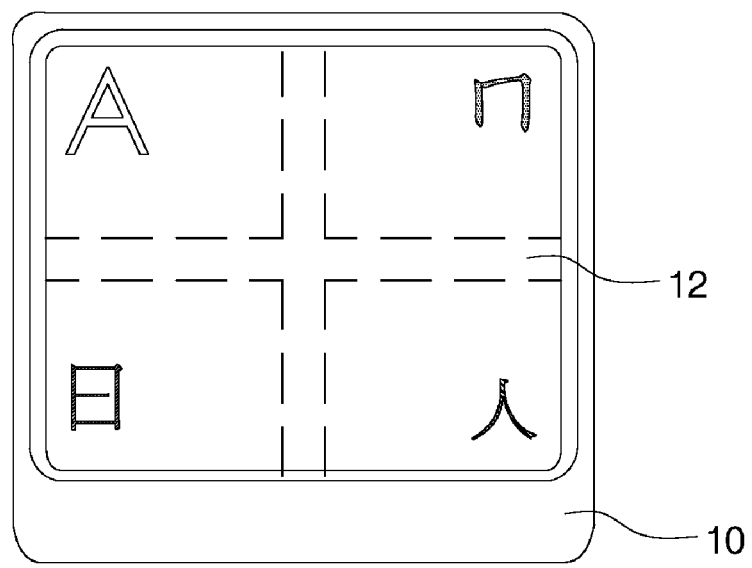
FIG. 5 is a top plan view of the key cap of FIG. 4 having its top surface printed with four characters (e.g., an English letter, a Mandarin phonetic symbol, a Dayi input symbol, and a Changjei input symbol) on its four corner portions.
Figure 6:
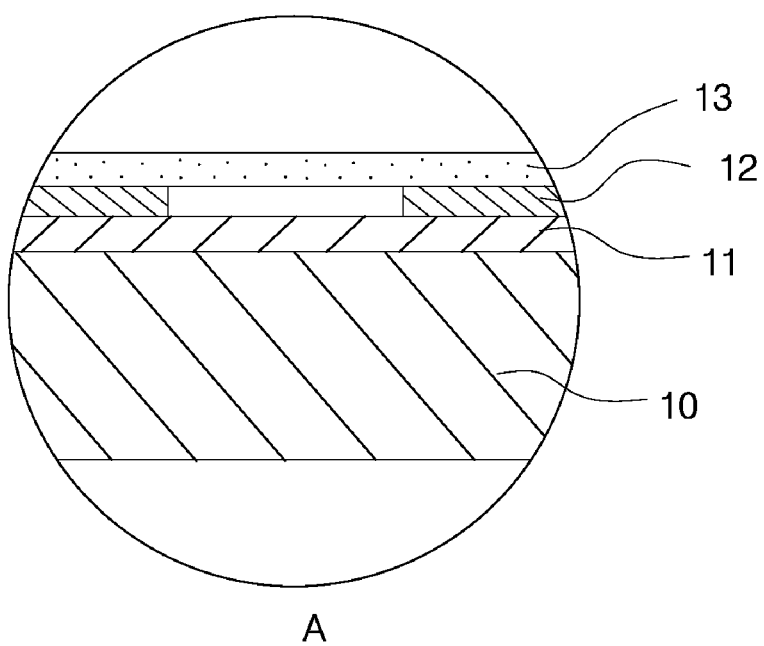
FIG. 6 is a detailed view of the area in circle A in FIG. 3.
Figure 7:
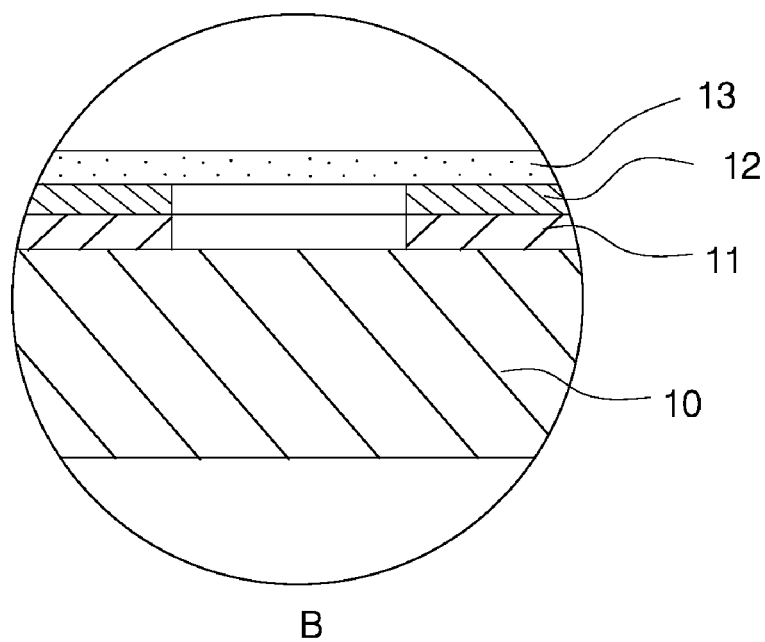
FIG. 7 is a detailed view of the area in circle B in FIG. 3 respectively.

In use, the luminescence panel 50 is adapted to electrically activate to emit light which illuminates the characters on the key caps 10 thereabove by passing light through the frame plate 30, the transparent color layers 11, the protective layer 13. In detail, a character on the key cap 10 having a unique color is backlit by the emitted light when the light passes therethrough in its upward illumination (see FIG. 6). Also, the emitted light shows its original multi-color by passing through the gaps between the characters on the key cap 10 (see FIG. 7). These different colors mix to render a subtle but sufficient light for an operator to use a computer keyboard without difficulties. Still for example, as shown in FIG. 5, green light may illuminate English letter "A", yellow light may illuminate Mandarin phonetic symbol "ㄇ", blue light may illuminate Changjei input symbol "θ", and red light may illuminate Dayi input symbol "人" respectively. That is, different colors are shown on different characters on the key caps 10.

The keyboard of the invention enables a user to easily operate a computer in a low light or dark environment.

While the invention herein disclosed has been described by means of specific embodiments, numerous modifications and variations could be made thereto by those skilled in the art without departing from the scope and spirit of the invention set forth in the claims.

What is claimed is:

1. A keyboard for use with a computer, the keyboard comprising:
   a plurality of substantially square key caps formed of a transparent material and each including on a top surface a plurality of spaced transparent color layers occupying a predetermined area proximate four corners and being different in color from each other, an opaque layer on the color layers and having portions overlapped with the color layers being removed, and a plurality of characters printed on the opaque layer;
   a plurality of bridges each including a first member and a second member pivotably connected together at a center line wherein each of the first and the second members has a top edge pivotably secured to an underside of the key cap;
   a transparent substantially rectangular frame plate pivotably secured to a bottom edge of each of the first and the second members and including a plurality of holes and a plurality of elastic, hollow contact inserts anchored in the holes;
   a PCB under the frame plate and being adapted to electrically connect to the contact inserts when the contact inserts contact it;
   a luminescence panel under the PCB and including a plurality of cells each disposed below the key cap by a predetermined distance, each cell including a plurality of regions being different in color from each other; and
   a base plate for supporting the frame plate, the PCB, and the luminescence panel,
   wherein each cell of the luminescence panel is adapted to electrically activate to upward emit light for showing multi-color when passing a gap between the color layers and showing a backlit color when passing one of the color layers, and wherein the backlit color of each one of the color layers is different from that of another one of the color layers.

2. The keyboard of claim 1, further comprising printing each of a plurality of second characters on a corresponding one of the color layers.

3. The keyboard of claim 1, wherein the frame plate further includes two spaced snapping grooves proximate one edge and two spaced guide grooves proximate the other edge, each key cap further includes two spaced bottom troughs proximate one edge, two spaced guide grooves proximate the other edge, and a central post, and the first member includes a pivot shaft pivotably secured in the snapping grooves.

4. The keyboard of claim 3, wherein the second member includes two pins slidably mounted in the guide grooves, and the first member further includes a pivot shaft along a bottom edge, the pivot shaft of the first member being pivotably secured in the snapping grooves.

5. The keyboard of claim 1, wherein each contact insert has a top sleeve put on the post and an internal stem adapted to push downward to contact the PCB for conduction.

* * * * *